United States Patent [19]

Bachinski

[11] Patent Number: 5,240,479

[45] Date of Patent: Aug. 31, 1993

[54] PLEATED FILTER MEDIA HAVING A CONTINUOUS BEAD OF ADHESIVE BETWEEN LAYERS OF FILTERING MATERIAL

[75] Inventor: Thomas J. Bachinski, Minnetonka, Minn.

[73] Assignee: Donaldson Company, Inc., Minneapolis, Minn.

[21] Appl. No.: 702,610

[22] Filed: May 17, 1991

[51] Int. Cl.⁵ .................. A62B 18/08; A62B 19/00; A62B 7/10; A62B 23/02

[52] U.S. Cl. .................. 55/103; 55/487; 55/521; 55/528; 55/DIG. 33; 128/206.12; 128/206.17; 156/291

[58] Field of Search .................. 128/201.25, 205.12, 128/205.25, 205.27–205.29, 206.12, 206.16, 206.17; 55/521, 500, 498, 4, DIG. 33, DIG. 35, 103, 487, 528; 156/291

[56] References Cited

U.S. PATENT DOCUMENTS

| | | |
|---|---|---|
| 3,595,245 | 7/1971 | Buntin . |
| 3,615,995 | 10/1971 | Buntin . |
| 3,676,242 | 7/1972 | Prentice . |
| 3,684,415 | 8/1972 | Buntin et al. . |
| 3,704,198 | 11/1972 | Prentice . |
| 3,755,527 | 8/1973 | Keller et al. . |
| 3,802,980 | 4/1974 | Harmon .................. 156/291 |
| 3,825,379 | 7/1974 | Lohkamp et al. . |
| 3,825,380 | 7/1974 | Harding et al. . |
| 3,826,602 | 7/1974 | Shaffer et al. . |
| 3,829,274 | 8/1974 | Melead . |
| 3,841,953 | 10/1974 | Lohkamp et al. . |
| 3,849,241 | 11/1974 | Butin et al. . |
| 3,865,535 | 2/1975 | Langdon et al. . |
| 3,878,014 | 4/1975 | Melead . |
| 4,075,106 | 2/1978 | Yamazaki .................. 156/291 |
| 4,211,807 | 7/1980 | Yazawa et al. .................. 156/291 |
| 4,215,682 | 8/1980 | Kubik et al. .................. 128/205.29 |
| 4,386,948 | 6/1983 | Choksi et al. .................. 128/205.29 |
| 4,452,619 | 6/1984 | Wright et al. .................. 55/521 |
| 4,460,426 | 7/1984 | Saito .................. 156/291 |
| 4,548,626 | 10/1985 | Ackley et al. .................. 128/206.17 |
| 4,650,506 | 3/1987 | Barris et al. . |
| 4,714,486 | 12/1987 | Silverthorn .................. 128/205.29 |
| 4,743,488 | 5/1988 | Jones et al. .................. 156/291 |
| 4,877,433 | 10/1989 | Oshitari .................. 55/521 |
| 4,886,058 | 12/1989 | Brostrom et al. .................. 128/206.15 |
| 4,940,500 | 7/1990 | Tadokoro et al. .................. 55/521 |
| 4,961,974 | 10/1990 | Jones .................. 55/521 |
| 4,995,333 | 2/1991 | Keller et al. .................. 156/291 |
| 5,063,926 | 11/1991 | Forsgren et al. .................. 128/206.17 |

Primary Examiner—Edgar S. Burr
Assistant Examiner—Kimberly L. Asher
Attorney, Agent, or Firm—Merchant, Gould, Smith, Edell, Welter & Schmidt

[57] ABSTRACT

A pleatable filter media, suitable for a use in a respirator for humans, is disclosed comprising a filter material including a meltblown polymeric material, such as polypropylene. A laminate construction is disclosed of the filter material comprising a plurality of layers of the meltblown polypropylene laminated together with adhesive. The filter media is preferably glassless. Protective layers enclose the layers of meltblown polypropylene. Methods of manufacture of pleated material are disclosed wherein the adhesive between the layers is extruded in a particular pattern to provide increased stiffness in the machine direction of the pleated filter media. Methods of manufacture are also disclosed wherein the filter media is pleated before the adhesive has cured, and the adhesive is then permitted to cure while the filter media is maintained in the pleated state. Methods of manufacture are also disclosed wherein the filter media is heated, and possibly compressed, after pleating to help form stiffer pleats and sharper pleat tips.

15 Claims, 5 Drawing Sheets

PLEATED FILTER MEDIA HAVING A CONTINUOUS BEAD OF ADHESIVE BETWEEN LAYERS OF FILTERING MATERIAL

FIELD OF THE INVENTION

The present invention relates generally to a pleated filter media element. The present invention also relates to methods of manufacturing pleated filter media elements. In particular, the present invention relates to a pleated glassless filter media element and a method of manufacturing same for a respirator.

BACKGROUND OF THE INVENTION

Various different types of filtration media are used in a variety of applications for the filtration and removal of particles from fluid such as air. One use of filtration media is in connection with respirators. Various types of respirators are known, including respirator units having single or double respirator cartridges secured to a face mask or hood. Filtration media may also be used in connection with filtration systems for computer systems, such as in connection with disk drives.

Filter media comprising glass-based materials, such as fiberglass, are well known. However, glass-based filter media have several problems. One significant problem is that glass particles making up the filter media have a propensity to become dislodged from the filter media. When the filter media is pleated, the glass fibers may shear and splinter. These particles may become airborne. In the case of respirators, airborne glass particles may cause health problems. Also, with sensitive equipment, such as computer disk drives, loose glass particulate from the filter media may damage the equipment in some circumstances.

Finding a pleated filter media for addressing the problems of particles becoming dislodged from the filter medias has been a continuing problem. Finding a nonglass-based, or glassless, pleated filter media for replacing glass based media has been a particularly difficult problem to solve. The difficulty in finding a suitable filter media, preferably glassless, has been in meeting performance requirements without exceeding size limitations or being too costly to manufacture. Relevant performance characteristics include the ability of the filter media to filter particles having particular sizes. Another performance characteristic is the ability of air to pass through the filter media. Typically, certain minimum and/or maximum standards need to be met.

In the case of respirators to filter particulates from air for breathing purposes, the performance requirements are particularly important. The respirator must be capable of filtering certain sized particles from the air to prevent the particles from entering the respiratory tract. At the same time, the respirator must not itself create safety problems for the user, such as producing loose particulates of filter media, as in the case of glass-based media. Also, the respirator must be sufficiently permeable to air such that the user does not have to work too hard to draw air through the respirator. Some respirators may be worn for extended periods of time, such as several hours or more. The respirators may also be worn during physical exertion where even greater volumes of filtered air are needed.

With respect to size limitations for the design of the filter media, the thickness of filter media can affect pleatability of the filter media. If the filter media is too thick, the filter media may be difficult to fold into pleats having desirable sharp pleat tips and generally planar pleat faces.

Another size consideration is the amount of effective filter area necessary for the filter media to meet the performance requirements. With respect to respirators, the size of the effective filter area, and the size of the filter media in the pleated state, is of particular concern since the respirators are typically worn as part of a mask or hood carried by the user. One known method of making a filter media more permeable to the passage of air, and easier to draw air through the filter, is to increase the effective filter area. However, this presents problems in meeting maximum size limitations for the respirators.

Other considerations with respect to pleated filters in general relate to pleat spacing and pleat stiffness. When forming a filter media into a pleated filter, it is important that the pleats be spaced at the appropriate distance from adjacent pleats to maintain the proper effective filter area. If the pleats are too close, or touch, effective filter area is reduced. A reduced filter area will likely detrimentally affect performance of the filter. Often, additional structure is added to the filter media to space the pleats at the appropriate distance. For example, sometimes beading is added to the filter media for spacing of the pleat tips at the appropriate spaced apart distance. Alternatively, the pleated filter media may be provided with particular structure integral to the pleats to provide for adequate spacing. The pleats may include dented pleat tips or dimples placed in the pleat faces to assist in proper pleat spacing.

Pleat stiffness is also an important consideration with respect to pleat spacing and also the problem of pleat bowing. Pleat bowing can occur when the pleats bend along the pleat faces such that adjacent pleats contact one another. Bowing generally results in a loss of effective filter area, and also a loss of performance. Bowing can also occur if the pleats are not properly formed. For example, rounded pleat tips may encourage pleat bowing.

It is clear that a need exists for a filter media meeting high performance and size requirements for particular applications, such as in respirators, as well as not being excessively time consuming or costly to manufacture. It is also clear that a need exists for a pleated filter media and method for making the same wherein the pleated filter media also addresses the pleat spacing and pleat stiffness problems. Preferably, the material comprising the filter media is a non-glass or "glassless" system, so that the problems associated with glass fibers are avoided.

SUMMARY OF THE INVENTION

According to the present invention, a pleatable filter media, suitable for a use in a respirator cartridge for a respirator, is provided comprising a filter material which significantly reduces, and preferably eliminates, the problems caused by particles of filter material becoming separated from the filter media. Preferably, the filter media includes a meltblown polymeric material, and more preferably, a meltblown polypropylene is used. The preferred filter media of the present invention is glassless.

The preferred filter media has performance characteristics of a pressure drop measured at an airflow of 1.5 fpm of less than 0.6 inches of $H_2O$, more preferably less than about 0.5 inches of $H_2O$, and most preferably less than or equal to about 0.41 inches of H₂O. The preferred filter media has an efficiency measured at a particle size of 0.3 microns moving at 10.5 fpm flow challenge of at least 99.97%, and preferably at least about 99.99%. Stiffness of the pleated media is preferably greater than 200 milligrams measured on a Gurly stiffness tester, more preferably, about at least 800 to 1200 milligrams.

A laminate construction for the filter material is preferred comprising a plurality of layers of meltblown polypropylene laminated together with adhesive. Preferably, the adhesive is extruded onto one of the layers of material to be joined before the second layer is provided.

Protective layers enclose the layers of meltblown polypropylene. These layers are preferably the same material as the filter material. These protective layers provide minimal filtering capability and are highly permeable to airflow. The layers may be adhered to the filter material, or they may be heated to the point of melting and reflowed into attachment with the filter material.

The present invention provides a pleated filter media which is useful in a respirator for human use wherein the filter media effectively filters particles to prevent them from entering the respiratory tract. The media does not create hazards to the user like glass-based media, and the media is sufficiently permeable to the passage of air such that the user is not required to work excessively to breathe while using the respirator.

According to other aspects of the invention, methods of manufacture of pleated material are provided wherein adhesive between layers of the filter media is extruded in a particular pattern to provide increased stiffness in the machine direction of the pleated filter media. The adhesive is preferably applied through an extrusion process onto the first layer of material to be joined in a bead pattern defined by a significant portion of the adhesive having lines in a direction at an angle of between 0 and 60 degrees to the machine direction. More preferably, the angle is at least 15 degrees and less than or equal to 60 degrees, more preferably about 25 to 35 degrees, and most preferably about 30 degrees. Preferably, the bead pattern is alternated to achieve a crosshatch pattern as successive layers of material are adhered together.

According to other aspects of the invention, methods of manufacture are also provided wherein the filter media is pleated before the adhesive has cured, and the adhesive is then permitted to cure while the filter media is maintained in the pleated state. Pleating before curing is advantageous because the stiffness provided by the adhesive is not present when the pleats are formed. Stiffer pleats and sharper pleat tips result when the adhesive is pleated before the adhesive has cured, and then permitting the adhesive to cure while the filter media is maintained in the pleated state.

The present invention also provides methods of manufacture wherein the filter media is heated, and possibly compressed, after pleating to help form stiffer pleats and sharper pleat tips. Heat may be provided to accelerate curing of the adhesives between the various layers of the filter media. Heat may also be provided to alter the stiffness properties of the protective layers such that they become stiffer. Another significant advantage for applying heat in combination with the compression is to permit heating of the protective layers sufficiently to melt and reflow the material wherein adjacent pleats become attached through material reflow once the protective material is subsequently cooled. Heat may also be applied to soften and possibly reflow the protective material, and possibly the filter material too, in the region of the pleat tips to relieve stresses formed in the tips after pleating. Heat may also be employed to attach the layers of protective material to the filter material through material reflow. These and other advantages and features of novelty which characterize the invention are pointed out with particularity annexed hereto, and forming a part hereof. However, for better understanding of the invention, its advantages and objects obtained by its use, reference should be had to the drawings which form a further part hereof and to the accompanying descriptive matter in which there is illustrated and described a preferred embodiment of the invention.

BRIEF DESCRIPTION OF THE FIGURES

In the drawings in which like reference numerals indicate corresponding parts throughout the several views.

DETAILED DESCRIPTION OF THE INVENTION

Figure 1:
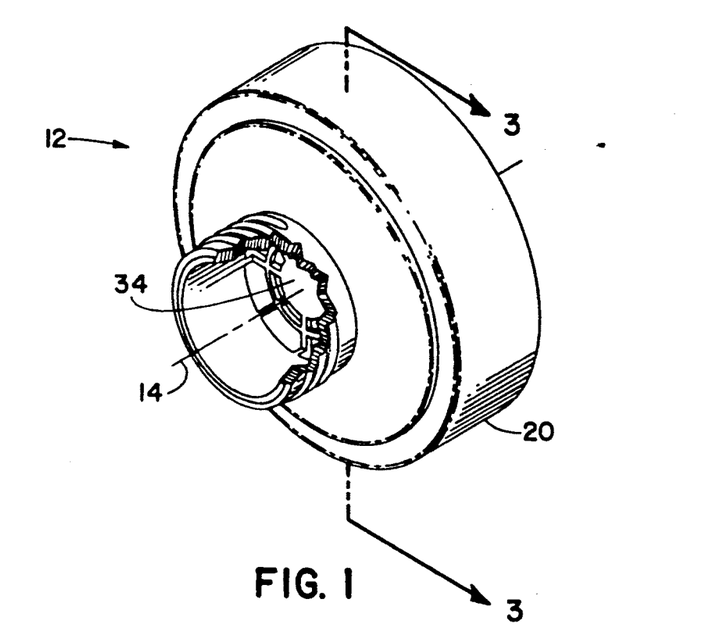
FIG. 1 is a perspective view of a respirator cartridge including a filter media made in accordance with the principles of this invention.
Figure 2:
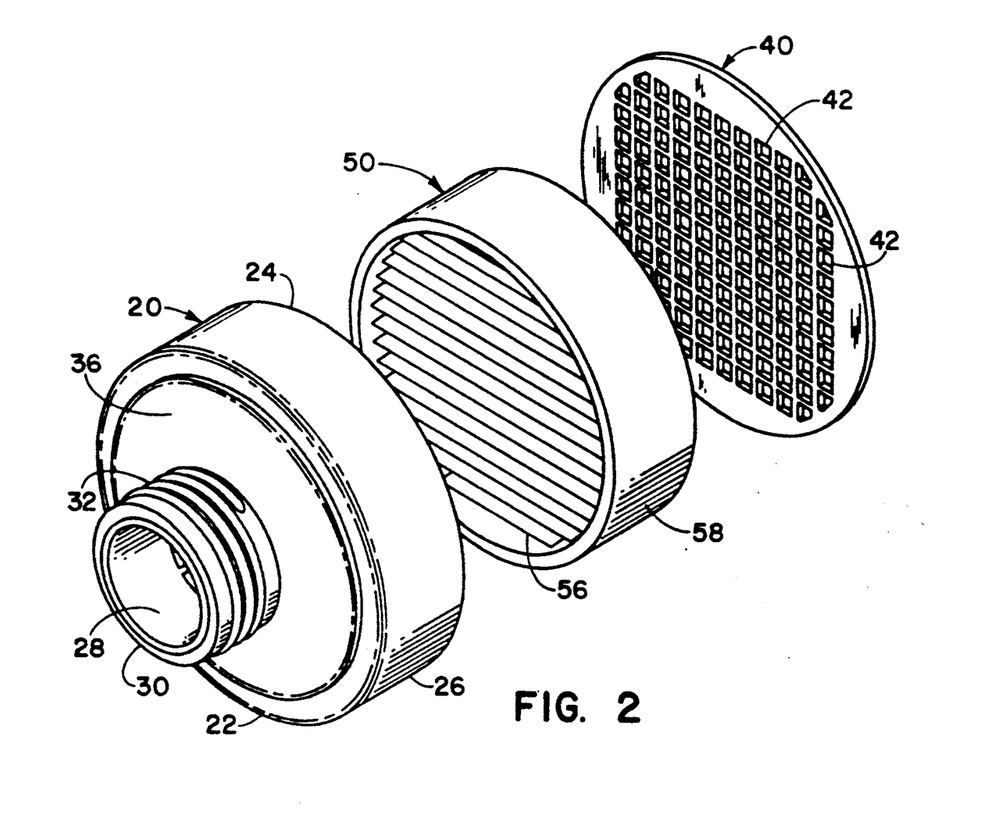
FIG. 2 is an exploded view of the respirator cartridge shown in FIG. 1.
Figure 3:
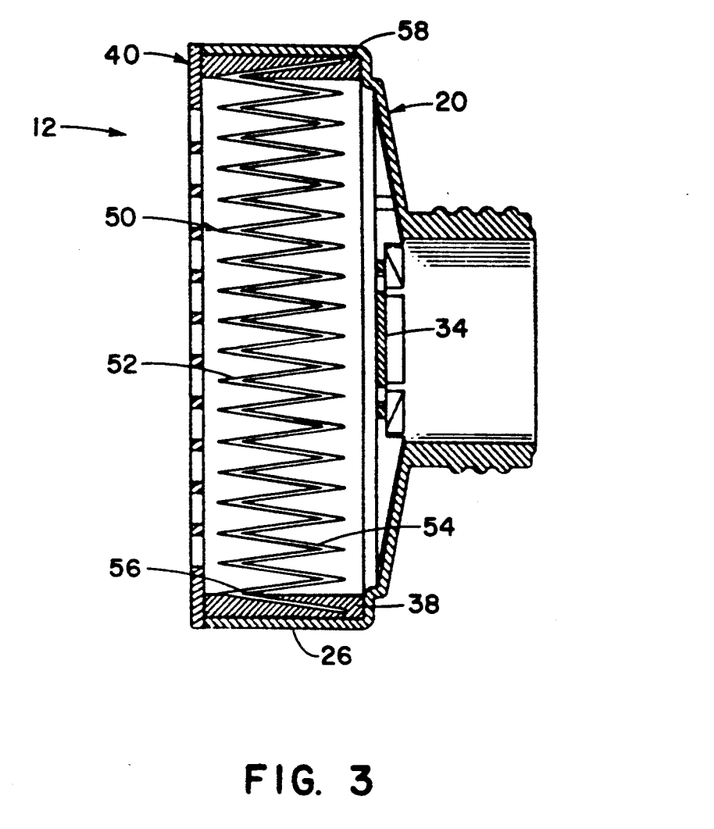
FIG. 3 is a cross-sectional side view of the respirator cartridge shown in FIG. 1 taken generally along lines 3—3.

Referring now to the drawings, there is shown in FIGS. 1—3 an embodiment of a respirator cartridge 12. As shown by FIG. 2, the embodiment of the respirator cartridge 12 includes three major components, a body element 20, a cover element 40, and a filter media element 50. When assembled into respirator cartridge 12, the body element 20, the cover element 40, and the filter media element 50 are centered on, and aligned along, central axis 14.

In the respirator cartridge 12 shown in FIGS. 1-3, body element 20 has a substantially cylindrical shape with a first end 22, a second end 24, and a peripheral wall defining a side wall segment 26. The body element 20 includes an orifice 28 in wall 36 at the first end 22 of the body element 20. The orifice forms a first opening into the cartridge 12. For the embodiment shown, orifice 28 is defined by a neck 30 with exterior threads 32 to facilitate attachment to a face mask or hood-like type respirator assembly (not shown). In this description, "mask" refers to any portable apparatus or device worn by humans which creates a filtered environment around the mouth and/or the nose by filtering air from the exterior of the mask, thereby providing filtered air to the respiratory system.

Cover element 40 is substantially circular and includes apertures or holes 42 passing therethrough. The holes 42 form a second opening into the cartridge 12. The cover element 40 is affixed to the second end 24 of body element 20 enclosing the filter media element 50 within the volume or chamber defined by wall 26, wall 36, cover 40, thus forming respirator cartridge 12. The chamber cooperates with the orifice 28 and the holes 42 to form a airflow passageway through the cartridge. As best shown in FIGS. 2 and 3, for the embodiment shown, filter media element 50 is substantially circular and includes inner filtering surface 52 and outer filtering surface 54. A peripheral side edge 56 of filter media element 50 is affixed in sealing relation to an inner surface 38 of body element 20, with cured sealant layer 58.

Cartridge 12 may have a variety of sizes. Preferably, the chamber inside of cartridge 12 is cylindrical and has a height less than equal to about 5.0 inches, more preferably less than or equal to about 3.0 inches, most preferably less than or equal to about 1.25 inches, and a diameter of less than or equal to about 6.0 inches, more preferably less than or equal to about 4.5 inches, most preferably less than or equal to about 3.0 inches. The body 20 and the cover 40 may be made from a variety of materials including plastics.

Body element 20 also preferably includes a sealant dispersion member 34 with a grid-like configuration mounted in orifice 28. Preferably the sealant dispersion member 34 is integrally formed with body 20. The sealant dispersion member 34 is used during manufacturing to assist in the process of affixing filter media element 50 in place in respirator cartridge 12. One method for manufacturing the respirator cartridge is to first assemble body element 20, cover element 40, and filter media element 50 (with the sealant layer 58 yet to formed). The respirator cartridge 12 is then rotated about the axis 14 which is aligned vertically. While rotating the respirator cartridge, uncured sealant is placed or dropped onto the sealant dispersion member 34. Centrifugal force moves the sealant radially outward toward the wall 26. The sealant dispersion member 34 helps guide the uncured sealant to the proper location along the wall 26 to form a uniform layer of sealant, without wetting the filter media element. Once the sealant has cured into layer 58, the filter media element 50 is securely affixed in place within the respirator cartridge 12.

Figure 4:
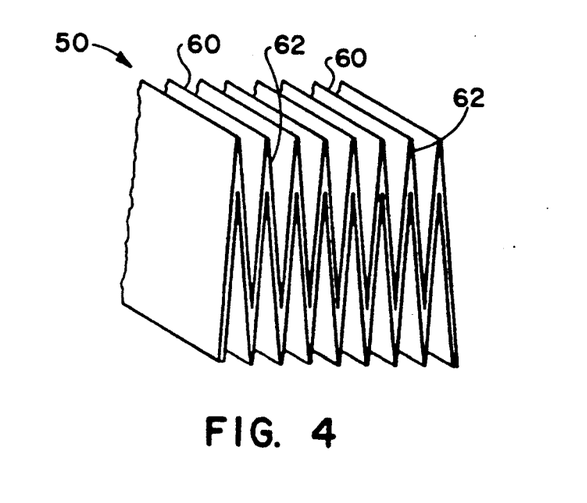
FIG. 4 is an enlarged perspective view of a portion of the filter media shown in FIG. 3.

As best shown in FIGS. 3 and 4, filter media element 50 is provided with the plurality of pleats, or folds, forming pleat tips 60 and pleat faces 62. As is well known in the art, pleating of a planar filter media element results in an increase in the effective filter area of the filter media element 50 per unit area defined by the outer perimeter of the pleated filter media.

The filter media element 50 of the present invention addresses several problems. Pleated glass-based filter media, including media made of fiberglass, have been employed in respirators. These media pose problems from dislodged or loose particles of filter media becoming separated from the filter media and breathed by the user. The filter media 50 of the present invention is made from a material with a reduced propensity to produce loose particles of filter media. Preferably, the filter media is a glassless filter media.

The preferred filter media of the present invention includes a filter material for filtering particulate comprising meltblown plastic or polymeric material. Meltblown materials and manufacturing processes are known. In general, meltblown fibers useable according to the present invention are an air laid continuous extrusion of fibers joined to each other to form a sheet or layer of filter material. Plastics such as polypropylene, polystyrene, and polyester may be used. Plastics, such as these, are generally more ductile than glass-based media, such that the meltblown fibers of plastic are less likely to splinter or break, such as during pleating or handling. A preferred material for use as a respirator filter media in applications of the present invention is polypropylene.

More preferably, the filter material of the present invention is a laminate structure comprising a plurality of layers of meltblown polypropylene. In the preferred embodiment, each layer of meltblown polypropylene has a permeability of at least 20 feet per minute (fpm) as measured with a Frazier permeability test apparatus; more preferably, the permeability for each layer is at least about 30 fpm, more preferably, at least 40 fpm. A Frazier test apparatus measures the ability of air to pass through the material being tested under known test conditions as specified by ASTM D76,D737, herein incorporated by reference.

Each layer of preferred material for the laminate structure has an efficiency measured at a particle size of 0.3 microns (diameter) at 10.5 fpm flow challenge of at least 80%. Generally, efficiency is a measure of the percentage of particles subjected to the filter media at a specific speed which are filtered or trapped by the filter media. Efficiency may be measured with various tests procedures including: a DOP test; a Fomblin test;, and a Sodium Chloride test. A DOP test is a known test and is defined generally by MIL STD 282 IESRP-CC-001, herein incorporated by reference. A Fomblin test is a similar test to the DOP test except that different particles are used. It is believed that the DOP test is a more stringent test in that smaller particles may be used in the DOP test, approximately 0.2 microns—DOP vs. 0.3 microns—Fomblin. The Sodium Chloride test is defined generally under CFR Part 30 of National Institute for Occupational Safety and Health (NIOSH) standards, and is herein incorporated by reference.

More preferably, the efficiency for each layer of the filter media is at least about 87% and most preferably at least about 88%, measured at 0.3 microns at 10.5 fpm. Preferably, each layer of meltblown polypropylene has a weight per unit area of between 15 and 50 grams/square meter, and a thickness in the range of 0.001 to 0.030 inches.

A useful filter material comprising meltblown polypropylene, having a permeability of about 42 fpm (Frazier), an efficiency measured at a particle size of 0.3 microns at 10.5 fpm flow challenge of about 88%, a weight per unit area of about 30 grams per square meter, and a thickness of about 0.009 inches is obtainable from Hollingsworth and Vose Company of East Walpole, Mass., under the trade designation PE-13030. The material is available in sheet form, and can be used to form a multilayer laminate. It is believed that the average fiber thickness of the PE-13030 meltblown filter material is about 3.2 microns.

It is also believed that each layer of PE-13030 material is provided by the manufacturer with an electrostatic charge. The electrostatic charge results in electrostatic filtering capability, in addition to the mechanical filtering capability of the filter material. Therefore, filtering of particulates occurs both mechanically, by trapping of the particles on the filter media, and electrostaticly, by using the electric charge to attract oppositely charged particles to the filter media.

Figure 5:
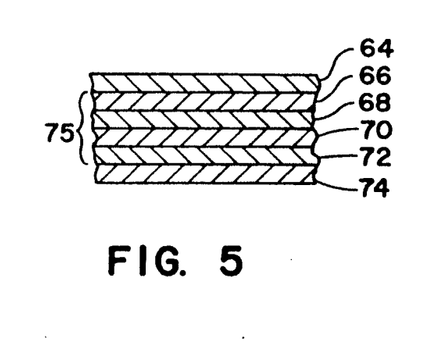
FIG. 5 is a schematic side view of the preferred filter media illustrating the layers which comprise the filter media.

A preferred filter media 50 of the present invention was made from four layers of the PE-13030 filter material placed in stacked relationship. FIG. 5 shows a schematic view of the four layers 66,68,70,72 of the PE-13030 filter material in filter media 50. The four layers 66,68,70,72 make up a filter material layer, or filter material 75, for filtering particulates.

In the preferred structure of filter media 50, the layers 66,68,70,72 of meltblown polypropylene are laminated together with adhesive. In FIG. 5, the adhesive is not shown, since it would comprise a very thin layer. One known adhesive useful for adhering the layers of filter material together is methylene bisphenyldiisocyante. Such adhesive is available from National Starch of Bridgewater, N.J. under Model No. PVR70-7141. Methylene bisphenyldiisocyante is polyamide-based adhesive. These adhesives may also be known as reactive hot melts. These adhesives are extrudable and may be catalyzed by both heat and/or humidity. As will be discussed below, methylene bisphenyldiisocyante performs well for extrusion to the appropriate bead thickness and desired locations for adhering between the layers of filter material. This adhesive may also be catalyzed by heat and/or humidity, and cures in an appropriate time frame for filter media manufacturing. It is to be appreciated that a variety of adhesives can be used for adhering the layers of filter material together, however, methylene bisphenyldiisocyante is preferred.

One preferred method of adhering the layers of filter material together is by extruding the glue into a continuous glue bead which is applied to one of the layers of material to be adhered. The second layer of material is then adhered to the first layer. Additional layers may be added by applying glue between the layers of material previously adhered and the next layer to be added. In the preferred preparation of filter media 50 according to the present invention, the glue bead is extruded to a thickness of between 0.001 to 0.007 inches; more preferably, about 0.002 to 0.003 inches.

Various weights per unit area of the glue may be applied to adhere adjacent layers of the filter material together. Weights per unit area in the range of about 0.1 gram/square foot to 5.0 grams/square foot are typically sufficient. A weight per unit area of about 0.015 to 0.025, i.e. about 0.2, grams/square foot is desired in the preferred filter media 50.

A thicker stream of extrusion, relative to a thinner stream of extrusion for a given weight of adhesive, will impact permeability less. That is, a thicker stream of extrusion results in less adhesive per unit area than a thinner stream of extrusion for the same weight of adhesive. In addition, a thicker stream of extrusion of the adhesive is believed to create a stiffer laminate structure than if a thinner stream is used.

In the preferred filter media 50, outer layers of protective material are provided to protect the filter material 75. That is, preferably the filter media laminate of layers 66,68,70,72 is enclosed between layers of protective material. Such a system of protective material is advantageous. More specifically, in the case of meltblown layers of polypropylene as the filter material 75, the filter material may be easily scuffed or otherwise damaged during the pleating process or during other phases of manufacturing and handling. If the filter material 75 becomes damaged, the particle filter efficiency of the filter media may be reduced. As illustrated in FIG. 5, a protective layer 64 is provided to protect the top surface of the top layer 66 of filter material 75. Also, a protective layer 74 is provided to protect the bottom surface of the bottom layer 72 of the filter material 75.

In the preferred embodiment, the protective layers comprise polypropylene. The layers 64,74 of protective material are provided for protecting the filter material and preferably have little or no (i.e. minimal) filtration properties. The protective layers 64,74 may also function as a stiffener for the filter media 50. In the preferred embodiment, each of the layers 64,74 of protective material is an extruded polypropylene layer. In the preferred filter media 50, each protective layer has a thickness of about 0.005 inches. Such a material is commercially available as DELNET ® brand sheets from Applied Extrusion Technologies of Middletown, Del. under the designation RB0707-30P. It is believed that such material may be formed using a gravure process wherein the layer of material is formed against a roller. It is preferred that such material also have no more than 10% of the holes in a square inch be blocked. Preferably, the protective material has a permeability measured with a Frazier permeability test apparatus of at least between about 400 to 600 feet per minute (fpm). The layers 64,74 of protective material can have a variety of thicknesses as long as the layers do not provide filter media 50 with such a thickness that pleatability is adversely affected.

The preferred material of the protective layers 64,74 is polypropylene. Polypropylene is a material which is capable of thermoplastic reflow, or reflowing in the presence of heat. One reason for providing filter material and protective material of the same or similar compositions is that reflowing of the protective material with the filter material is sometimes desireable, as will be discussed below. In addition, reflowing of the protective layers may also be desirable to attach adjacent pleats to each other during manufacturing. This will be also discussed below in greater detail. Alternatives to polypropylene protective layers 64,74 may be used. Such alternatives include polyester materials.

One anticipated method of attaching the layers 64,74 of protective material to the filter material 75 includes applying adhesive to the top surface and the bottom surface filter material 75 and adhering the layers of protective material to the filter material. A variety of adhesives may be used for adhering the layers of protective material to the filter material. In the preferred filter media 50, the same adhesive is used as that used for adhering the layers 66,68,70,72 of filter material together. Further, the adhesive is applied in a similar fashion as for adhering layers of filter material together.

As noted above, the adhesive used in manufacturing the preferred filter media 50 is preferably extruded onto the appropriate locations between the layers 66,68,70,72 of the filter material, and possibly the layers of protective material 64,74, to be adhered together. Any of a variety of known adhesive extrusion machines may be used. A extrusion machine available through Nordson Corporation of Amherst, Ohio works well.

Figure 6:
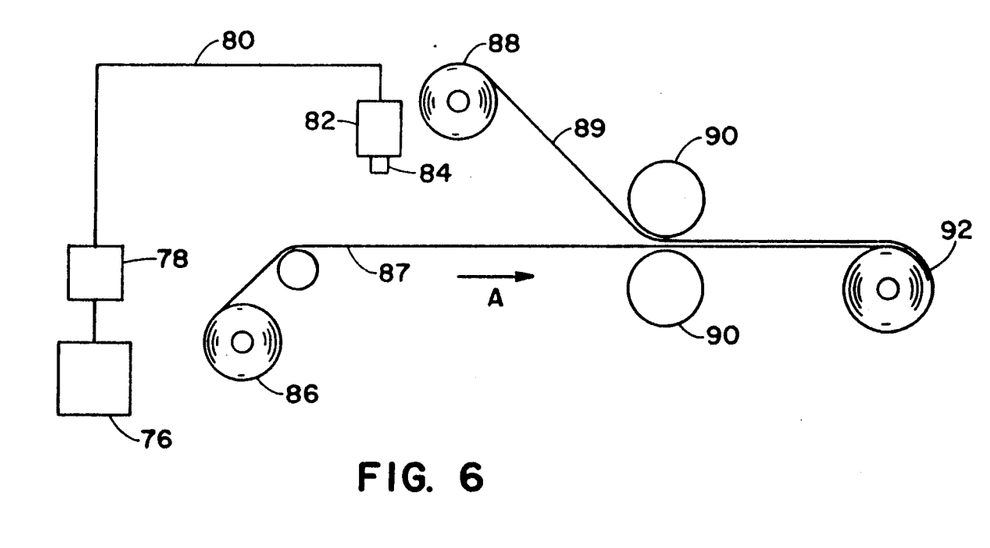
FIG. 6 is a schematic view of an apparatus for adhering two layers of material together with glue, in conduction of a process according to the present invention.

FIG. 6 is a schematic representation of a typical apparatus for gluing two layers of material together, in applications of the present invention. Adhesive maintained in reservoir 76 is pumped through line 80 by pump 78 to extruder 82, with a nozzle 84. Roll 86 of first material 87 unrolls first material 87. First material 87 is moved relative to the nozzle 84 in a first direction, called the machine direction and referred to as arrow A in the Figures. The nozzle 84 extrudes a continuous stream or bead of adhesive from the nozzle 84 onto the layer of first material 87. Roll 88 of second material 89 unrolls the second material 89 for attachment, or lamination, to the first material 87. Rollers 90 apply a pressure to the materials, to facilitate attachment of the layers.

The rollers 90 or equivalent apply pressure to the layers to assure secure attachment of the layers 87,89. This pressure is referred to as nip pressure. Preferably, the nip pressure is between 1 pound per square inch (psi) and 90 psi. More preferably, the nip pressure is between about 15 and 20 psi. If too much pressure is applied, permeability may be altered to such a degree that the performance characteristics may be adversely affected. Too little nip pressure will result in poor lamination.

The adhesive may be applied between adjacent layers in several different patterns to the glue bead. One known pattern is formed by moving the nozzle 84 back and forth in a direction generally transverse to the moving layer of first material 87. The first material 87 is moving in the machine direction (arrow A) in FIG. 6.

Figure 7:
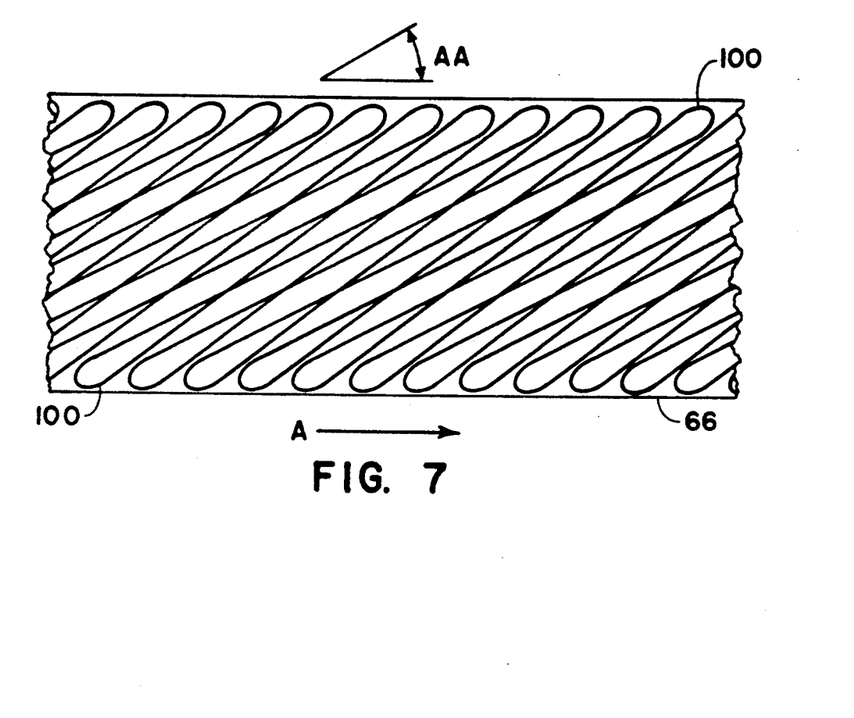
FIG. 7 is a schematic view of a preferred pattern to a glue bead for adhering two layers together.

One technique for increasing the stiffness of the filter media 50 to affect pleat stiffness is to apply the adhesive extrusion bead between the layers wherein the bead defines a path having a linear or fairly linear portion with a component transverse to the direction of pleats formed in filter media 50. This may be accomplished during manufacturing by applying the bead to the first layer of material 87 in a manner wherein the nozzle 84 is moved back and forth with respect to the first layer 87 of material in a direction which is not transverse to the machine direction, but instead at an angle greater than 0 degrees and less than 90 degrees to the machine direction. FIG. 7 is a schematic representation of the bead pattern for the adhesive extrusion bead 100 on the first layer 66 of filter material. The angle of the extrusion bead 100 is represented by angle AA, and the machine direction is represented by arrow A.

Preferably, the angle of the adhesive extrusion bead is between 0 and 60 degrees from the machine direction; more preferably, the angle is at least 15 degrees and less than or equal to 60 degrees; more preferably about 25 to 35 degrees; and most preferably, 30 degrees. It is believed that by angling the adhesive bead, a significant portion of the adhesive bead is applied in a pattern of substantially parallel lines. Because of operation of the extrusion apparatus, portions of the extrusion bead pattern are, or may be, at a variety of different angles with respect to the machine direction. However, a significant portion of the extrusion bead pattern is in a direction of angle AA.

The adhesive could alternatively be applied in a random or atomized spray pattern. However, an atomized spray pattern has unidirectional stiffness without achieving a stiffness as great as by moving the nozzle in a generally back and forth parallel path. By applying the adhesive in a continuous stream, with a majority of the adhesive bead paths being in unidirectional alignment, increased stiffness will result. By angling at least one layer of adhesive in a direction less than 90 degrees to the machine direction, an increase in stiffness will result in the machine direction. If the extrusion stream is applied to the first layer 66 in a direction generally transverse, or at 90 degrees, to the machine direction, any stiffness increase from the adhesive bead pattern will generally only result in an increase in stiffness in the cross-machine direction. For pleated filters, the increase in stiffness in this direction is not necessary when the pleats are formed generally transverse to the machine direction.

Figure 8:
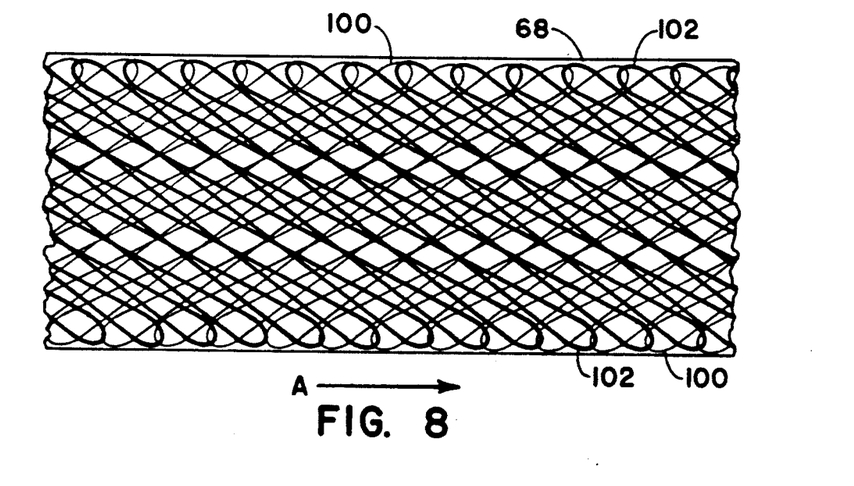
FIG. 8 is a schematic view of the preferred pattern for the glue bead for adhering a third layer to a second layer adhered to the layer shown in FIG. 7, the glue bead pattern shown in FIG. 8 illustrating the crosshatch pattern obtainable when the glue bead pattern is applied to the second layer in a direction opposite to the glue bead pattern between the first and second layers with respect to machine direction.

FIG. 8 is a schematic view of the preferred glue pattern for laminating three layers together. FIG. 7 shows one preferred glue pattern for adhering the first layer 66 to the second layer 68 of material. FIG. 8 shows the preferred glue pattern for adhering the second layer 68 to a third layer (not shown). In FIG. 8, the first layer 66 of material is behind second layer 68 and adhesive extrusion bead 100 used to adhere first layer 66 to second layer 68 is shown by the thinner lines. By applying a layer of adhesive to a top surface of the second layer 68 of material, a third layer of material can be joined. To adhere the second layer 68 of material to the third layer of material, an extrusion bead 102 (thicker lines) is preferably applied in a similar fashion as extrusion bead 100. However, extrusion bead 102 is applied in a direction opposite to the direction of the extrusion bead 100. That is, instead of applying the extrusion bead 102 in the direction of angle AA, the nozzle is moved to apply the extrusion bead at an angle of negative angle AA with respect to the machine direction. FIG. 8 then illustrates the cross-hatch effect of alternately applying the adhesive bead in a pattern at both angles to the machine direction and at angles to the cross-machine direction.

A preferred method of manufacturing the filter media 50 is to form the pleats while the adhesive is wet, or before the adhesive has cured to a particular point. By pleating while the adhesive is wet (before the adhesive cures beyond a particular point), the filter media does not have to overcome the forces applied by the cured adhesive which seek to maintain the filter media in its cured position. By allowing the adhesive to cure with the pleats maintained in the pleated state, stiffer pleats and sharper pleat tips are produced. The term "wet" in this context is defined generally to be the time period from when the glue is applied until the point roughly where glue has cured sufficiently to be hardened but is still tacky. Once hardened, the glue will continue to cure until the tackiness is gone.

With respect to the preferred adhesive, methylene bisphenyldiisocyante, it is preferred that the pleats be formed before 4–6 hours after the adhesive has been applied and the layers adhered together, with the filter media maintained at environmental conditions of approximately 72 degrees Fahrenheit and 25 to 35% humidity. It is most desireable that the pleats be formed immediately after the layers have been laminated together. With the preferred adhesive, the glue is still wet until about 3 hours after applied and maintained at the conditions noted above. The glue hardens at between about 3 and 30 hours and gradually loses its tackiness over time until about 30 to 72 hours have elapsed.

Figure 9:
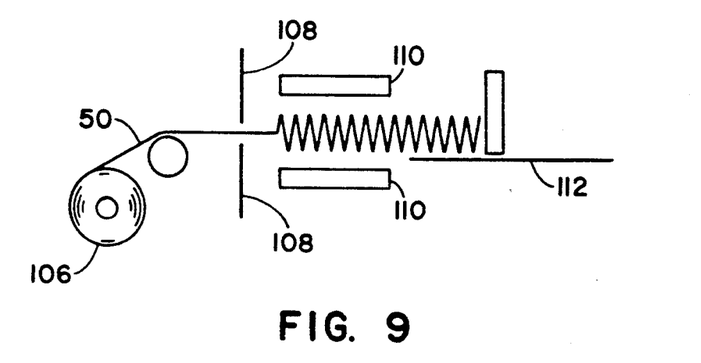
FIG. 9 is a schematic view of an apparatus for use in manufacturing a pleated filter media according to the present invention.

FIG. 9 is a schematic representation of an apparatus used to pleat the filter media. A roll 106 of filter media 50 is pleated with pleater blades 108. Heater platens 110 are provided. A compression assembly 112 applies a back pressure to the pleats as they are formed to hold the filter media in the pleated state.

Any of a variety of known pleater apparatus may be employed. A rotary pleater, specifically a Robofsky type, works well when pleating filter media with uncured adhesive present between the layers. Pleat rates of between 1 pleat per minute to 100 pleats per minute are preferred. A pleat rate of 25 pleats per minute is more preferable. The filter media 50 of the present invention has a thickness in the range of 0.039 to 0.045 inches, more preferably in the range of 0.040 to 0.043 inches, and a most preferred thickness of about 0.042 inches. With a thickness in these ranges, the filter media may be properly pleated with the Robofsky pleater while minimizing or eliminating the problems of tearing of the outer pleat tips and/or folding along the inner pleat tips. These problems arise for thicker filter media and prevent proper pleat formation.

The heater platens 110 are provided for several purposes, with each purpose providing its own advantages. First, the heater platens are provided to accelerate curing of the adhesives between the various layers. Continued curing after heating with the heater platens may take place at ambient conditions or a variety of heat and humidity conditions. Before the adhesive completely cures, further enhanced stiffness may be achieved by rebake or hot roller techniques. Rebake is a process in which the pleated filter is placed in a particular heated environment for a prolonged period of time. Hot roller processing is a technique in which the pleated material is rolled with heated rollers in a flat sheet state and then rereefed to reform the pleats. It is to be appreciated that increased performance may also occur over time as the adhesive continues to cure. In some cases, significant increases of performance, in the range of 10 to 15%, may occur as late as 3 to 4 months after manufacture.

The heater platens 110 may also be provided to heat the protective layers of the filter media to alter the stiffness properties of the protective layers. The protective material may be of the type which becomes stiffer after exposure to heat under appropriate conditions. The DELNET ® sheets are one material having this property if heated at about 170 degrees Fahrenheit.

Figure 11:
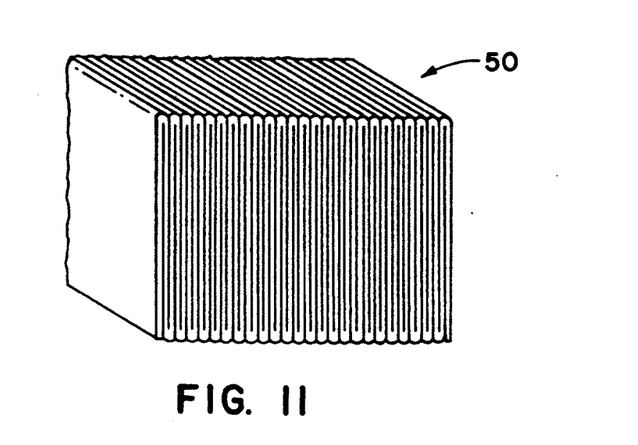
FIG. 11 is a perspective view of the filter media shown in FIG. 4, with pleats touching in a compressed pack form.

Another significant advantage for applying the heater platens 110 in combination with the compression assembly 112 is to permit the heater platens to heat the protective layer sufficiently to melt and reflow the material wherein adjacent pleats become attached through material reflow once the protective material is cooled. By applying appropriate compression, the pleats become stuck together, or self-fixtured. It has been found that reflowing of the protective layers occurs at a pleat rate of about 25 pleats per minute with the heater platens maintained at about a temperature of 180 degrees Fahrenheit. Compression, or back pressure, of about 4.0 pounds per inch of lineal width of pleated filter media permits adequate reflowing for self-fixturing. FIG. 11 illustrates the pleated filter media in the close-packed, or compressed, configuration. If the filter media has been self-fixtured, as described above, the pleated filter media will maintain the close-packed state without external forces being applied. However, before installation of the filter media 50 for use, the pleats must be separated.

Self-fixturing of the filter media 50 is beneficial for several reasons, one of which is that the pleated filter media is easier t handle. A pleated structure will typically want to unfold if the end pleats are held while the center pleats are unsupported. Typically, the filters in past had to be completely supported or clamped together in a compressed state. Self-fixturing assists in keeping the pleats from unfolding.

A further advantage is that by adhering the pleats together, the pleated material will not require any external structure to hold the pleats in their compressed or close-packed form for curing of the adhesive. If the adhesive is permitted to cure with the filter media in its compressed or close-packed state as occurs during self-fixturing, stiffer pleats and sharper pleat tips result. For some applications, a self-spacing filter media may result once the pleats are eventually separated. Additionally, by self-fixturing the pleats together, the pleated filter media can be packaged and transported before the adhesive has completely cured without using special packaging.

The heater platens 110 may also be provided to soften and possibly reflow the protective material, and possibly the filter material too, in the region of the pleat tips to relieve stress. After pleating, the filter media in the pleat tip region is under stress loading. By softening, or possibly reflowing, the material in the region, the stresses may be relieved. By relieving stresses in the material, the filter media may maintain sharper pleats in its final form.

Figure 10:
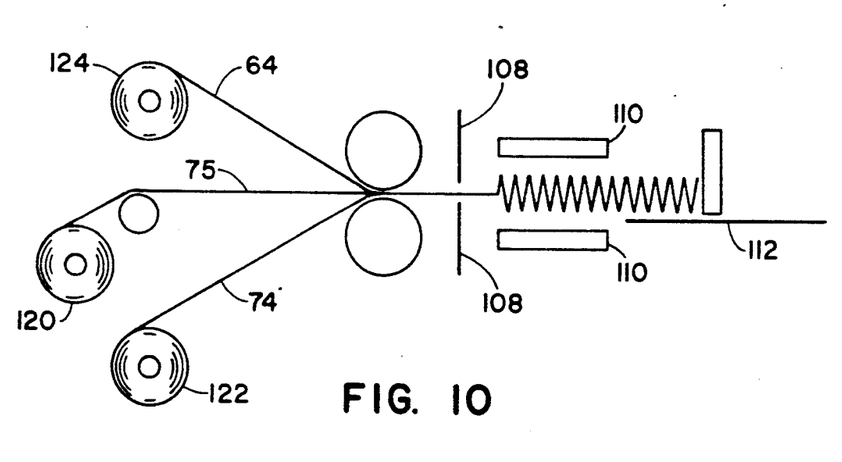
FIG. 10 is a schematic view of an alternate apparatus for use in manufacturing the pleated filter media in a modified form according to the present invention.

The heater platens 110 may also be employed to attach the layers of protective material to the adhered layers of filter material. FIG. 10 represents an apparatus configured to attach the layers 64,74 of protective material to the filter material 75 such that adhesive is not required. Instead, the heater platens 110 apply heat to reflow the protective layer material such that it attaches to the filter material. This preferably occurs only at the pleat tips. Further, this may occur with or without reflowing of any of the filter material. If the filter material is reflowed too much, a loss of efficiency may occur.

The temperature of the heater platens 110 is set at the desired temperature to achieve one or more of the purposes of the heat platens noted above. At the preferred pleat rate of 25 pleats per minute, the temperature of the heater platens is about 180 degrees Fahrenheit. The layer of protective material of DELNET ® sheet reflows at the tips at this temperature. The DELNET ® sheet at the pleat faces will stiffen at this temperature. Even though the preferred layer of protective material are made from the same material as the filter material, the layer of protective material is closer to the heat platens and also has a different structure which is believed to absorb heat more than the filter material such that the outmost layer of protective material will reflow before the adjacent layer of filter material. Through proper timing and temperature settings, reflow of the protective material can be controlled such that it will attach to the filter material without losing filtering capabilities of the underlying filter material. Further, through controlling of the temperature and time of the exposure to heat with the heat platens, and controlling the amount of load applied by the compression assembly, the springiness of the filter media can be controlled.

As noted above, the filter media 50 in the preferred embodiment is self-spacing.

Stiffness of the pleated media is preferably greater than 200 milligrams measured on a Gurly stiffness tester, more preferably, about at least 600 milligrams, and most preferably at least 800 to 1200 milligrams. Stiffnesses in these ranges are desirable for a number of reasons including a reduction of pleat bowing problems and to assist in pleat spacing.

As shown in FIGS. 1-3, the filter media 50 has a generally cylindrical shape when the pleats are properly spaced. One known process of cutting the pleated filter media is to plug form or cut the pleated filter media in a circular pattern having the desired dimensions from a larger sheet of filter media. Alternatively, the shape of the cylindrical filter media might be ultrasonically cut while the filter media is maintained in its close-packed state. In order to achieve the appropriate circular shape of the filter media when the pleats are appropriately spaced, the pattern of the ultrasonic cut of the close-packed filter media is not circular and has somewhat of an oval path. Once cut and the pleats appropriately spaced, the filter media 50 of the present invention is ready for installation into the body 20 and cover 40 of respirator cartridge 12 by such techniques as rotationally applying the sealant layer 58 using the sealant dispersion member 34 of body 20.

The preferred filter media 50 has performance characteristics of a pressure drop measured at 1.5 fpm airflow of less than 0.6 inches of $H_2O$, more preferably less than 0.5 inches of $H_2O$, and most preferably less than or equal to about 0.41 inches of $H_2O$. The filter media 50 has an efficiency measured at particle size of 0.3 microns at 10.5 fpm flow challenge of at least 99.97%. High efficiency particulate air media (HEPA) certified by the National Institute for Occupational Safety and Health (NIOSH) are capable of filtering out at least 99.97% of the particulates from a given test sample. The filter media 50 of the present invention exceeds the HEPA minimums. Preferably, the efficiency of the filter media 50 is at least 99.98%, more preferably at least 99.99%, more preferably at least 99.995%, most preferably at least 99.997%. Efficiencies greater than 99.99% are believed to meet Ultra Low Penetration Air (ULPA) requirements.

Filter media 50 of the present invention has a high efficiency of particle filtration and a low pressure drop produced by the passage of air through the filter media relative to some known glass-based media. Because of the higher efficiency a better filter media results. Because of the lower pressure drop, less of the media may be used in the respirator for making a desirable filter. If pressure drops were too great, the media would not be acceptable as a respirator filter since the user will have too work to hard to draw air through the media. One alternative is to increase the effective filter area to reduce the pressure drop. However, size limitations with respect to respirators can limit how big the media may be.

The filter media of the present invention provides an effective particle filter for a respirator to be used in a mask to be worn by a human. The filter media does not excessively restrict airflow through the respirator such that the user does not need to exert excessive effort to breathe and the user may comfortably wear the respirator for sufficiently long periods of time. The preferred filter media construction is a pleated media extending across, or generally transverse to, the airflow passageway, with the pleated filter media having sufficient permeability therethrough for comfortable use as a breathing filter for human use and sufficient filtering efficiency for protection of human lungs from particulate material under normal use conditions. It is to be appreciated that the size and weight, and therefore the airflow demands, of the user will vary. Typically, if the filter media is provided with a permeability such that when subjected to airflow at about 1.5 feet per minute, the pressure drop measured is about 0.6 inches of water or less, the user is comfortable wearing the mask. This is one test believed to equate generally with a measure of the desired permeability of the filter media for providing comfortable use. Of course, as the air permeability increases for the filter media, the comfort to the user will increase. If the pressure drop is about 0.5 inches of water or less, even greater comfort to the user results. Even greater comfort results at pressure drops of about 0.4 inches of water or less.

With respect to particle filter efficiency of filter media 50, the size of the particles desired to be filtered will vary depending upon the environment used. Typically, if the filter media is provided with an efficiency such that when subjected to particles having about 0.3 micron diameters moving at 10.5 feet per minute, about 99.97% of the particles are filtered, the user is adequately protected from particles while wearing the mask in many industrial environments. This is one test believed to equate generally with a measure of the desired efficiency of the filter media for providing a safe level of protection to the user. This test level is generally believed adequate for such environments as mining, working with asbestos, and painting. Even greater protection results as the efficiency percentage increases.

A preferred filter media was prepared under the conditions described below. Four layers of meltblown polypropylene PE-13030 having a permeability of about 42 fpm (Frazier), an efficiency measured at particle size 0.3 microns at 10.5 fpm flow challenge of about 88%, a weight per unit area of about 30 grams per square meter, and a thickness of about 0.009 inches were used to form a multilayer laminate. The layers were adhered with methylene bisphenyldiisocyante extruded to a thickness of about 0.002 to 0.003 inches and applied at a weight per unit area of about 0.2 grams/square foot. The web speed (speed of the material moving in the first direction) of the extrusion machine was about 60 feet per minute. Two layers of DELNET ® RB0707-30P sheets were adhered to the layers of adhered meltblown polypropylene filter material to enclose the filter material between the protective layers. The DELNET ® layers each had a thickness of 0.005 inches, a permeability of between 400 and 600 fpm, and no more than 10% of the holes blocked per square inch. All the adhesive layers were alternately applied at 30 degrees and minus 30 degrees to the machine direction. The nip pressure of the adhesive machine was between 15 and 20 psi. The filter media had a final thickness of about 0.042 inches. Before pleating and before the adhesives had cured (shortly after lamination), the filter media had a permeability of about 7 to 8 fpm.

The filter media was pleated shortly after lamination, about within one hour after lamination while maintained at 72 degrees Fahrenheit and 25-30% humidity. Pleating was done with a Robofsky type rotary pleater at a pleat rate of 25 pleats per minute. The heater platens had a length of about 8 inches and were spaced at about 0.020 inches from the pleat tips. The heater platens were maintained at a temperature of approximately 180 degrees Fahrenheit. A back pressure was applied by the compression assembly of about 4 pounds per lineal width inch of pleated filter media. The filter media was then permitted to cure at about 72 degrees Fahrenheit and about 25 to 30% humidity for approximately 36 hours while maintained in the close-pack state. Alternately, an accelerated curing is possible, for example, by curing the filter media at about 98 to 100 degrees Fahrenheit and about 95% humidity for 4 to 6 hours.

The filter media produced with the above conditions is pleatable to a height of about 0.94 inches and is self-spacing at about 5.5 pleats per inch. A "pleat" is the material forming a pleat tip and two full pleat faces as viewed from a single side of the filter media. The filter media was placed into a respirator cartridge of the type shown in FIGS. 1-3 having a generally cylindrical chamber with dimensions of about 3.0 inches in diameter and about 1.25 inches in height such that about 16 full pleats of filter media were available for filtering. Stiffness of the pleated media was between about 800 to 1200 milligrams on the Gurly stiffness tester. The pleated filter media had performance characteristics of a pressure drop measured at 1.5 fpm flow of about 0.41 inches of $H_2O$. The pleated filter media had an efficiency measured at particle size 0.3 microns at 10.5 fpm flow challenge of about 99.99% or greater, Fomblin tested, about 99.99% or greater, DOP tested, and about 99.99% or greater, Sodium Chloride tested. Results as high as 99.997 to 99.998% or better were obtained in some testing. An unpleated sheet of the material had an efficiency of about 99.999% or greater and a permeability of about 7 to 8 feet per minute measured on a Frazier test device shortly after lamination.

It must be understood, however, that even though numerous advantages and characteristics of the invention have been set forth in the foregoing description, together with details of the structure and function of the invention, the disclosure is illustrative only, and changes may be made in detail, especially in matters of shape, size and material of components within the principles of the invention, to the full extent indicated by the broad general meanings of the terms in which the appended claims are expressed.

what is claimed is:

1. A filter media comprising:
   a layer of filter material for filtering particulates;
   a second layer of material;
   an adhesive bead pattern layer between said layer of filter material and said second layer, wherein said adhesive bead pattern layer includes a continuous adhesive bead extending without interruption, said continuous adhesive bead defining a plurality of linear and parallel bead segments, said continuous adhesive bead further defining a plurality of connecting bead segments, each of said connecting bead segments extending between two of said linear and parallel bead segments;
   said filter media being pleated to define a plurality of pleat tips, each pleat tip defining a linear segment, said plurality of linear and parallel bead segments of said continuous adhesive bead being at an angle of said pleat tips wherein at least a portion of said plurality of linear and parallel bead segments of said continuous adhesive bead intersects at least one of said linear segments defined by said pleat tips.

2. A filter media comprising:
   a pleated filter material for filtering particulates, said filter material comprising meltblown polymeric material, said filter media having a sufficient permeability such that when subjected to airflow at 1.5 feet per minute the pressure drop is less than or equal to about 0.6 inches of water, said filter media having sufficient filter efficiency such that when subjected to particles having a 0.3 micron diameter and moving at 10.5 feet per minute flow challenge the efficiency is at least 99.97%;
   said pleated filter material including at least two layers;
   said pleated filter material defining a plurality of pleats, each pleat including a pleat tip and two pleat faces interconnected by said pleat tip, each of said pleat tips defining a linear segment;
   a continuous adhesive bead layer between two of said layers of said filter material, said continuous adhesive bead layer being a continuous adhesive bead extending without interruption, said continuous adhesive bead defining a plurality of linear parallel bead segments, said plurality of said linear and parallel bead segments extending in a direction which intersects said linear segment of at least one of said pleat tips, said continuous adhesive bead defining a plurality of connecting bead segments, each of said connecting bead segments extending between two of said linear and parallel bead segments.

3. The filter media of claim 2, wherein said meltblown polymeric material includes polypropylene.

4. The filter media of claim 2, wherein said filter media is glass less.

5. The filter media of claim 2, wherein said filter material comprises at least four layers of meltblown polymeric filter material, said layers of filter material being in stacked relationship with a top layer, a bottom layer and at least two middle layers, each of said at least four layers layer having:
   (i) a permeability measurable on a Frazier permeability test apparatus of at least 20 feet per minute; and
   (ii) an efficiency measured at 0.3 microns particle size, at 10.5 feet per minute flow challenge, of at least about 87% wherein the filter media including the at least four layers has the efficiency of at least 99.97%.

6. The filter media of claim 5, wherein the weight per unit area of each layer of filter material is in the range of between 15 and 50 grams per square meter.

7. The filter media of claim 6, wherein each of said layers of filter material have a weight per unit area of about 30 grams per square meter.

8. The filter media of claim 5, wherein each of said layers of filter material have a thickness of about 0.009 inches.

9. The filter media of claim 2, wherein said filter material includes an electrostatic charge.

10. The filter media of claim 5, further comprising adhesive between all of the four layers.

11. The filter media of claim 10, wherein said adhesive comprises an extruded polyamide-based adhesive.

12. The filter media of claim 5, further comprising a top layer and a bottom layer of a protective material, said filter material being secured between said top layer and said bottom layer of protective material.

13. The filter media of claim 12, wherein said top layer and said bottom layer of protective material comprise polypropylene sheets.

14. The filter media of claim 5, wherein the efficiency of each layer of filter material is about 88%, wherein the filter media including the at least four layers has the efficiency of at least 99.97%.

15. The filter media of claim 2, further comprising a filter media holder member, said filter media holder member having a first opening and a second opening, said filter media holder member having a chamber for receiving said filter media, said chamber being in airflow communication with said first opening and said second opening, said filter media being positioned in said chamber to filter particulates from air passing from said first opening to said second opening, said chamber having a generally cylindrical shape with a height less than or equal to about 5.0 inches and a diameter of less than or equal to about 6.0 inches.

* * * * *

UNITED STATES PATENT AND TRADEMARK OFFICE
CERTIFICATE OF CORRECTION

PATENT NO. : 5,240,479

DATED : August 31, 1993

INVENTOR(S) : Thomas J. Bachinski

It is certified that error appears in the above-identified patent and that said Letters Patent is hereby corrected as shown below:

Column 15, line 63, delete "of" and insert --to--.

Column 16, line 21, insert --and-- between "linear" and "parallel".

Signed and Sealed this

Twenty-fourth Day of May, 1994

Attest:

BRUCE LEHMAN

Attesting Officer     Commissioner of Patents and Trademarks